(12) United States Patent
Li et al.

(10) Patent No.: US 9,234,252 B2
(45) Date of Patent: Jan. 12, 2016

(54) METHOD FOR CONTROLLING A-SHAPED SEGREGATION BY PURIFICATION OF LIQUID STEEL

(71) Applicant: INSTITUTE OF METAL RESEARCH CHINESE ACADEMY OF SCIENCES, Shenyang (CN)

(72) Inventors: Dianzhong Li, Shenyang (CN); Paixian Fu, Shenyang (CN); Hongwei Liu, Shenyang (CN); Lijun Xia, Shenyang (CN); Yiyi Li, Shenyang (CN)

(73) Assignee: INSTITUTE OF METAL RESEARCH CHINESE ACADEMY OF SCIENCES, Shenyang (CN)

( * ) Notice: Subject to any disclaimer, the term of this patent is extended or adjusted under 35 U.S.C. 154(b) by 183 days.

(21) Appl. No.: 14/105,167

(22) Filed: Dec. 12, 2013

(65) Prior Publication Data

US 2014/0096648 A1    Apr. 10, 2014

Related U.S. Application Data

(63) Continuation-in-part of application No. PCT/CN2012/082978, filed on Oct. 15, 2012.

(30) Foreign Application Priority Data

Jul. 19, 2012  (CN) .......................... 2012 1 0251784

(51) Int. Cl.
*C21C 7/10* (2006.01)
*C21C 7/064* (2006.01)
*C21C 7/06* (2006.01)
*C21C 7/076* (2006.01)
*C21C 7/00* (2006.01)
*C22C 38/22* (2006.01)
*C22C 38/40* (2006.01)

(52) U.S. Cl.
CPC ............... *C21C 7/064* (2013.01); *C21C 7/0075* (2013.01); *C21C 7/06* (2013.01); *C21C 7/0645* (2013.01); *C21C 7/076* (2013.01); *C21C 7/10* (2013.01); *C22C 38/22* (2013.01); *C22C 38/40* (2013.01)

(58) Field of Classification Search
CPC ........ C21C 7/0075; C21C 7/10; C21C 7/064; C21C 7/06; C21C 7/076
See application file for complete search history.

(56) References Cited

U.S. PATENT DOCUMENTS

| 5,085,691 | A | * | 2/1992 | Nakonechny et al. ........... 75/546 |
| 2003/0172773 | A1 | * | 9/2003 | Sato et al. .................... 75/10.48 |
| 2009/0019968 | A1 | * | 1/2009 | Tada et al. .................... 75/10.41 |

FOREIGN PATENT DOCUMENTS

| CN | 101565801 | A | * | 10/2009 |
| GB | 2410253 | A | * | 7/2005 |

OTHER PUBLICATIONS

Hu, J et al. Patent CN 101565801 A published Oct. 2009. Machine translation and abstract.*

* cited by examiner

*Primary Examiner* — George Wyszomierski
*Assistant Examiner* — Tima M McGuthry Banks
(74) *Attorney, Agent, or Firm* — Matthias Scholl, PC; Matthias Scholl

(57) ABSTRACT

A method for controlling A-shaped segregation of steel ingot. The method includes: 1) controlling a content of phosphorus in liquid steel at less than or equal to 0.005 wt. % upon tapping from an electric furnace, preventing steel slag from entering a ladle, controlling content of harmful elements at less than or equal to 100 ppm; and adding between 3 and 15 kg of calcium oxide and less than or equal to 0.5 kg of aluminum to each ton of the liquid steel; 2) pre-deoxidizing the liquid metal using vacuum carbon deoxidation; 3) de-sulfurizing, controlling content of oxygen, and controlling the content of sulfur in the liquid steel at less than or equal to 0.005 wt. %; and 4) performing vacuum degasification, controlling the total oxygen content at less than or equal to 15 ppm; and casting the steel in the presence of inert gas or in vacuum.

10 Claims, 4 Drawing Sheets

METHOD FOR CONTROLLING A-SHAPED SEGREGATION BY PURIFICATION OF LIQUID STEEL

CROSS-REFERENCE TO RELATED APPLICATIONS

This application is a continuation-in-part of International Patent Application No. PCT/CN2012/082978 with an international filing date of Oct. 15, 2012, designating the United States, now pending, and further claims priority benefits to Chinese Patent Application No. 201210251784.6 filed Jul. 19, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method for controlling A-shaped segregation by purification of liquid steel.

2. Description of the Related Art

In the process of manufacturing steel ingots, casting defects including macrosegregation, large non-metallic inclusions, and central porosity often exist, thereby seriously affecting the forging quality. The macrosegregation, particularly A-shaped segregation (V-shaped segregation often occurs in continuous casting), is the worst defects that significantly affect the performance of products, and cannot be eliminated. Thus, a simple and practical method for solving the A-shaped segregation is desired. In A-shaped segregation regions, a large amount of inclusions exist, so that it is important to overcome the defects of the inclusions in the steel ingots. For some certain steel, for example, rotor steel, inclusions like $Al_2O_3$ and MnS in the A-shaped segregation critically influences the mechanical property of the steel, and becomes a source of fissures, thus, to decrease the A-shaped segregation in the steel ingot is conducive to improving the quality of forged pieces.

The A-shaped segregation region is accumulated with carbon, sulfur, phosphorus, oxides, sulfides, and gas, thereby producing much more abandoned products. A typical method for solving the A-shaped segregation in the steel ingot includes: introducing a foreign cooling matter, or external field treating, or intensifying external cooling of the steel ingot to fast solidify of the steel ingot or the blank, thereby eliminating or decreasing the A-shaped segregation. However, the method is difficult to operate and is inapplicable in the preparation of large steel ingot or blank Furthermore, it is possible to introduce large inclusions, thereby directly resulting in the abandonment of the steel ingot. Thus, it is necessary to develop a new method for tackling the A-shaped segregation problem in preparation of large steel ingot or large cross sectioned continuous casting blank. It has been found based on computer analogy, real time observation by X-ray, and physical anatomy that a main source of the A-shaped segregation is the inclusions, particularly $Al_2O_3$ and MnS. Although slowly flowing of interdendritic fluids facilitates the formation of the A-shaped segregation, it is not the origin of the A-shaped segregation.

SUMMARY OF THE INVENTION

In view of the above-described problems, it is one objective of the invention to provide a method for controlling A-shaped segregation of steel ingot by purification of steel liquid. The method is mainly focused on macrosegregation in the process of manufacturing steel ingot, and has an excellent effect in controlling the content, distribution, size of inclusions in black alloy material, decreasing gas content in the liquid steel, and finally significantly decreasing or eliminating the A-shaped segregation in the steel ingot.

To achieve the above objective, in accordance with one embodiment of the invention, there is provided a method for controlling A-shaped segregation of steel ingot, the method comprising the following steps:

1) upon tapping from an electric furnace, controlling a content of phosphorus at less than or equal to 0.005 wt. %, preventing steel slag from entering a ladle, controlling a content of harmful elements at less than or equal to 100 ppm; adding between 3 and 15 kg (including 3 kg and 15 kg) of calcium oxide and less than or equal to 0.5 kg of aluminum per ton of liquid steel for preventing a liquid metal from boiling;

2) pre-deoxidizing the liquid metal using a vacuum carbon deoxidation process for reducing the amount of inclusions;

3) de-sulfurizing using slag desulfurization technology in a ladle furnace for further removing the inclusions, controlling a content of oxygen, and controlling a content of sulfur at less than or equal to 0.005 wt. %; and 4) performing vacuum degasification in a vacuum degassing furnace for purifying the liquid metal and controlling a total oxygen content at less than or equal to 15 ppm; and casting in the presence of inert gas or in vacuum for further de-oxidization or preventing the content of the oxygen from increasing.

In a class of this embodiment, in step 1), the content of phosphorus is controlled at less than or equal to 0.005 wt. % before the tapping and not allowed to increase for between 10 and 20 min (including 10 min and 20 min); and carbon powder is added at an amount of between 0.1 and 2 kg per ton of the liquid steel for micro-deoxidization.

In a class of this embodiment, in step 1), the harmful elements comprise As, Sn, Sb, Bi, and Pb.

In a class of this embodiment, in step 1), no aluminum is added or less than 0.5 kg of aluminum per ton of the liquid steel is added.

In a class of this embodiment, in step 1), the tapping from the electric furnace employs eccentric bottom tapping or inverting a bottom drain ladle for preventing the steel slag from entering a refining ladle.

In a class of this embodiment, in step 1), the calcium oxide and aluminum are desiccated before addition, and are added synchronously for between 2 and 10 times.

In a class of this embodiment, the vacuum carbon deoxidation process in step 2) comprises: to each ton of the liquid steel, adding between 5 and 15 kg (including 5 kg and 15 kg) of calcium oxide, between 1 and 4 kg (including 1 kg and 4 kg) of carbon powder, and between 0.5 and 5 kg (including 0.5 kg and 5 kg) of a fluorite after removing the steel slag formed in the tapping.

In a class of this embodiment, in step 2), a temperature of the ladle before the vacuum carbon deoxidation process is controlled at between 1,610 and 1,650° C. (including 1,610° C. and 1,650° C.); and a vacuum degree is controlled between 0.25 and 5 torr for between 10 and 30 min while argon gas flow is controlled between 30 and 100 L/min.

In a class of this embodiment, after the pre-deoxidization in step 3), deep desulphurization is performed in the ladle furnace, a resulting slag comprises: between 50 and 70 wt. % (including 50 wt. % and 70 wt. %) of CaO, between 6 and 10 wt. % (including 6 wt. % and 10 wt. %) of $SiO_2$, between 10 and 30 wt. % (including 10 wt. % and 30 wt. %) of $CaF_2$, between 1 and 3 wt. % (including 1 wt. % and 3 wt. %) of $Al_2O_3$, less than 6 wt. % of MgO, less than 0.9 wt. % of FeO+MnO, and remaining Fe. A retention time for maintaining the content of FeO+MnO to be less than 0.9 wt. % of the total steel slag exceeds 30 min, and the content of sulfur is required to be less than or equal to 0.005 wt. %. The vacuum carbon deoxidation is performed again if the smelting process does not meet the above requirements.

In a class of this embodiment, in step 4), the liquid metal after refined in the ladle furnace is introduced to the vacuum degassing furnace for smelting, the vacuum degree in the vacuum degassing furnace is controlled between 0.25 and 2 torr (including 0.25 torr and 2 torr). The liquid metal is purified for between 20 and 40 min by stirring while introducing argon gas from a bottom of the ladle at a flow of between 40 and 100 L/min. During the casting, vacuum casting is performed on large steel ingot having a weight of exceeding 30 ton for further deoxidation and degassing, or normal pressure casting is performed in the presence of inert gas for preventing the content of oxygen from increasing.

Advantages of the invention are summarized as follows:

1. By purification of the liquid metal, the method of the invention reduces the harmful elements and inclusions in the liquid metal, and reduces the content of the sulfur, phosphorus, and oxygen in the liquid metal. By using the vacuum carbon deoxidation process, oxygen is removed by carbon in vacuum or by rare amount of aluminum or no aluminum, free of oxidation products, so that the A-shaped segregation is prevented or eliminated. Thus, the method of the invention is simple and practical to improve the quality of the steel ingot.

2. By strictly controlling the smelting process of the liquid metal, the method prevents the steel slag from entering the ladle thereby preventing rephosphorization and preventing the content of phosphorus from increasing. Refining slag is deep desulfurized for controlling the content of sulfur at 0.005 wt. % below thereby shortening the smelting duration. The smelting process performed in the vacuum degassing furnace is conducive to the decrease of the gas content in the metal liquid. By adopting the combination of the above process, the purity of the liquid metal is improved, and the A-shaped segregation is eliminated or prevented. Compared with other methods for controlling A-shaped segregation, the method of the invention is much practical in operation, and is creative and significant for large cross sectioned steel ingots and continuous casting blanks.

3. The method is applicable for manufacturing all steel ingots of large tonnage and continuous casting blanks, particularly steel ingots and blanks having large cross section and large tonnage. The method is capable of significantly improving the internal quality of the steel ingots and blanks.

In summary, the method uses purification smelting process and casting control process to decrease the inclusion and gas in the liquid metal, improve the purity of the liquid metal, and realize the elimination or prevention of the A-shaped segregation. The method is applicable for manufacturing black metal including carbon steel and alloy steel, various round ingots, square ingots, and various continuous casting blanks and continuous casting blanks having large cross sections.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for controlling A-shaped segregation are described below. It should be noted that the following examples are intended to describe and not to limit the invention.

The method comprises the following steps:
1) A content of phosphorus is controlled at less than or equal to 0.005 wt. % upon tapping from an electric furnace for preventing steel slag from entering the ladle, and meanwhile harmful elements comprising As, Sn, Sb, Bi, and Pb are controlled to allow a total content thereof to be less than or equal to 100 ppm, and a content of each of the harmful elements is controlled to be less than or equal to 0.006 wt. %.
2) Liquid metal is pre-oxidized by vacuum carbon deoxidation process, during which, a common aluminum deoxidizer is excluded, and the number of the inclusions is decreased.
3) Deep desulfurization is performed by using a ladle furnace (refining furnace), the inclusions are removed, a content of oxygen is controlled, and a content of sulfur is controlled at less than or equal to 0.005 wt. %.
4) Deoxidation, degassing, and inclusion removal are performed in a vacuum degassing furnace (VD) for the purification of the liquid metal and allowing a total oxygen content to be less than or equal to 15 ppm, and preferably be less than or equal to 10 ppm.

EXAMPLE 1

Figure 1:
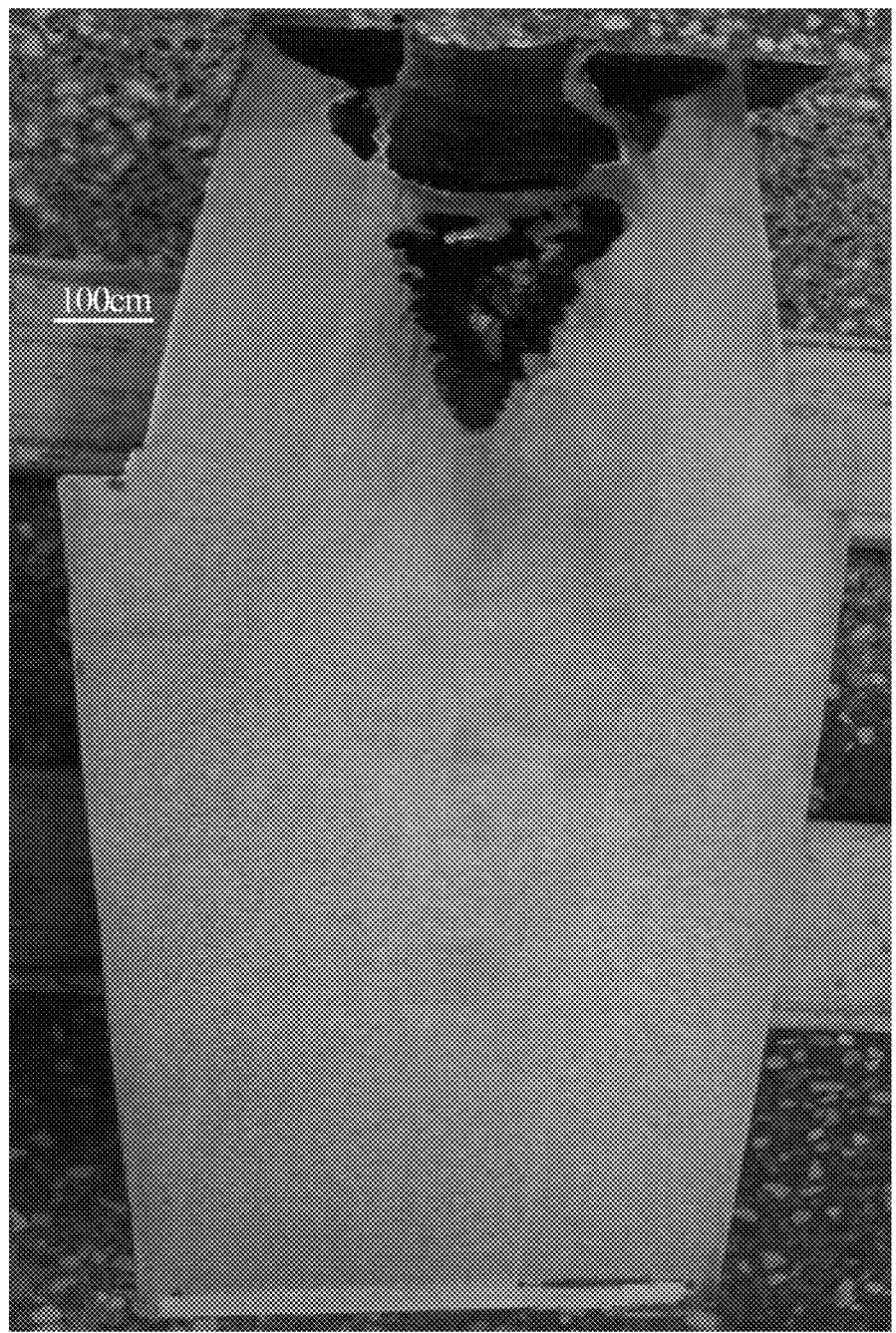
FIG. 1 is an electronic microscope image showing macro examination results of 500 kg of a 45# steel ingot in accordance with one embodiment of the invention.

500 kg of 45# sand steel ingot was casted, and smelted in an electric furnace in vacuum. A content of phosphorus was controlled at 0.003 wt. % and the content was not allowed to increase within 15 min. 0.5 kg of carbon powder per ton of the liquid steel was added for pre-deoxidation. A total content of harmful elements comprising As, Sn, Sb, Bi, and Pb was controlled at 80 ppm, and a content of each of the harmful elements was controlled at less than or equal to 0.005 wt. %. When the liquid steel was poured out of the electric furnace, 12 kg of calcium oxide per ton of the liquid steel was added, and the calcium oxide was required to be desiccated and was added 4 times. After steel slag was formed, the slag was skimmed. The steel slag was fully removed after the tapping. For each ton of liquid steel, 10 kg of calcium oxide, 2 kg of carbon powder, and 1.5 kg of fluorite were added for formation of new slag. A temperature of the steel ladle was controlled at 1,610° C. for vacuum carbon deoxidation process, during which, a vacuum degree reached 0.25 torr and the vacuum degree was maintained for 15 min while controlling an argon gas flow inside the steel ladle at 30 L/min. A ladle furnace was employed for deep desulfurization process after the pre-deoxidation process. A resulting slag comprises: 55 wt. % of CaO, 8 wt. % of $SiO_2$, 15 wt. % of $CaF_2$, 1 wt. % of $Al_2O_3$, 4 wt. % of MgO, 0.6 wt. % of FeO+MnO, and remaining Fe. A retention time for maintaining the content of FeO+MnO to be 0.7 wt. % of the total steel slag exceeds 30 min The content of sulfur was 0.005 wt. %. The liquid metal refined in the ladle furnace was introduced to the vacuum degassing furnace for smelting. The vacuum degree in the vacuum degassing furnace was controlled at 0.5 torr. The liquid metal was purified for 25 min by stirring while introducing argon gas from a bottom of the ladle at a flow of 70 L/min. After vacuum casting, it was known from the steel ingot anatomical results that no A-shaped segregation existed in internal steel ingot, an average of the total oxygen content of the steel ingot was 8 ppm, as shown in FIG. 1.

EXAMPLE 2

Figure 2:
FIG. 2 is an electronic microscope image showing macro examination results of 60 ton of a 12Cr2Mo1 steel ingot in accordance with one embodiment of the invention.

60 t of 12Cr2Mo1 steel ingot was casted and taped in the form of eccentric bottom tapping for preventing steel slag from entering a steel ladle. A content of phosphorus was controlled at 0.003 wt. % before the tapping from the electric furnace and the content was not allowed to increase within 15 min. 0.5 kg of carbon powder per ton of the liquid steel was sprayed for pre-deoxidation. A total content of harmful elements comprising As, Sn, Sb, Bi, and Pb were controlled at 80 ppm, and a content of each of the harmful elements was controlled at less than or equal to 0.005 wt. %. When the liquid steel was poured out of the electric furnace, to each ton of the liquid steel, 10 kg of calcium oxide and 0.2 kg of aluminum were added 3 times, and the calcium oxide and the aluminum were desiccated before addition. After steel slag was formed, the slag was skimmed. The steel slag was fully removed after the tapping. For each ton of liquid steel, 10 kg of calcium oxide, 1 kg of carbon powder, and 1 kg of fluorite were added for formation of new slag. A temperature of the steel ladle was controlled at 1,620° C. for vacuum carbon deoxidation process, during which, a vacuum degree reached 1 torr and the vacuum degree was maintained for 20 min while controlling an argon gas flow inside the steel ladle at 50 L/min. A ladle furnace was employed for deep desulfurization process after the pre-deoxidation process. A resulting slag comprises: 50 wt. % of CaO, 7 wt. % of $SiO_2$, 15 wt. % of $CaF_2$, 2 wt. % of $Al_2O_3$, 4 wt. % of MgO, 0.7 wt. % of FeO+MnO, and remaining Fe. A retention time for maintaining the content of FeO+MnO to be 0.7 wt. % of the total steel slag exceeds 30 min prior to the tapping, and the content of sulfur was 0.004 wt. %. The liquid metal after refined in the ladle furnace was introduced to the vacuum degassing furnace for smelting, and the vacuum degree in the vacuum degassing furnace was controlled at 1 torr. The liquid metal was purified for 25 min by stirring while introducing argon gas from a bottom of the ladle at a flow of 70 L/min. After vacuum casting, it was known from the steel ingot anatomical results that no A-shaped segregation existed in internal steel ingot, an average of the total oxygen content of the steel ingot was 10 ppm, as shown in FIG. 2.

EXAMPLE 3

Figure 3:
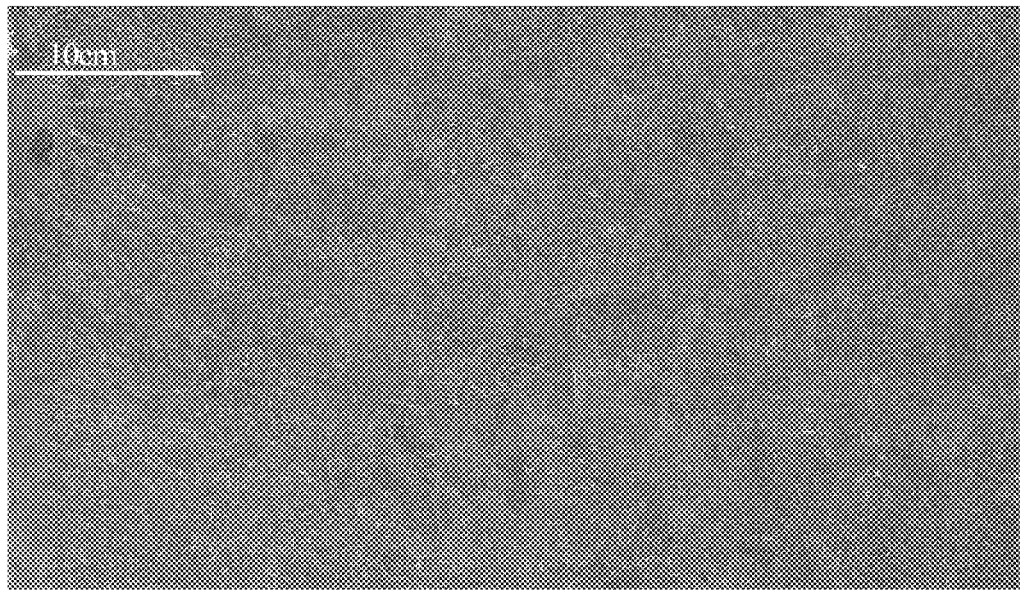
FIG. 3 is an electronic microscope image showing macro examination results of 45 ton of a 12Cr2Mo1 steel ingot in accordance with one embodiment of the invention.

45 t of 12Cr2Mo1 steel ingot was casted and taped in the form of eccentric bottom tapping for preventing steel slag from entering a steel ladle. A content of phosphorus was controlled at 0.004 wt. % before the tapping from the electric furnace and the content was not allowed to increase within 11 min. 0.8 kg of carbon powder per ton of the liquid steel was sprayed for pre-deoxidation. A total content of harmful elements comprising As, Sn, Sb, Bi, and Pb were controlled at 70 ppm, and a content of each of the harmful elements was controlled at less than or equal to 0.004 wt. %. When the liquid steel was poured out of the electric furnace, to each ton of the liquid steel, 12 kg of calcium oxide and 0.3 kg of aluminum were added 4 times, and the calcium oxide and the aluminum were desiccated before addition. After steel slag was formed, the slag was skimmed. The steel slag was fully removed after the tapping. For each ton of liquid steel, 9 kg of calcium oxide, 2 kg of carbon powder, and 2 kg of fluorite were added for formation of new slag. A temperature of the steel ladle was controlled at 1,640° C. for vacuum carbon deoxidation process, during which, a vacuum degree reached 1.5 torr and the vacuum degree was maintained for 23 min while controlling an argon gas flow inside the steel ladle at 60 L/min. A ladle furnace was employed for deep desulfurization process after the pre-deoxidation process. A resulting slag comprises: 55 wt. % of CaO, 9 wt. % of $SiO_2$, 20 wt. % of $CaF_2$, 2 wt. % of $Al_2O_3$, 5 wt. % of MgO, 0.8 wt. % of FeO+MnO, and remaining Fe. A retention time for maintaining the content of FeO+MnO to be 0.8 wt. % of the total steel slag exceeds 35 min prior to the tapping, and the content of sulfur was 0.005 wt. %. The liquid metal after refined in the ladle furnace was introduced to the vacuum degassing furnace for smelting, and the vacuum degree in the vacuum degassing furnace was controlled at 0.5 torr. The liquid metal was purified for 20 min by stirring while introducing argon gas from a bottom of the ladle at a flow of 70 L/min. After vacuum casting, it was known from the steel ingot anatomical results that no A-shaped segregation existed in internal steel ingot, an average of the total oxygen content of the steel ingot was 9 ppm, as shown in FIG. 3.

EXAMPLE 4

Figure 4:
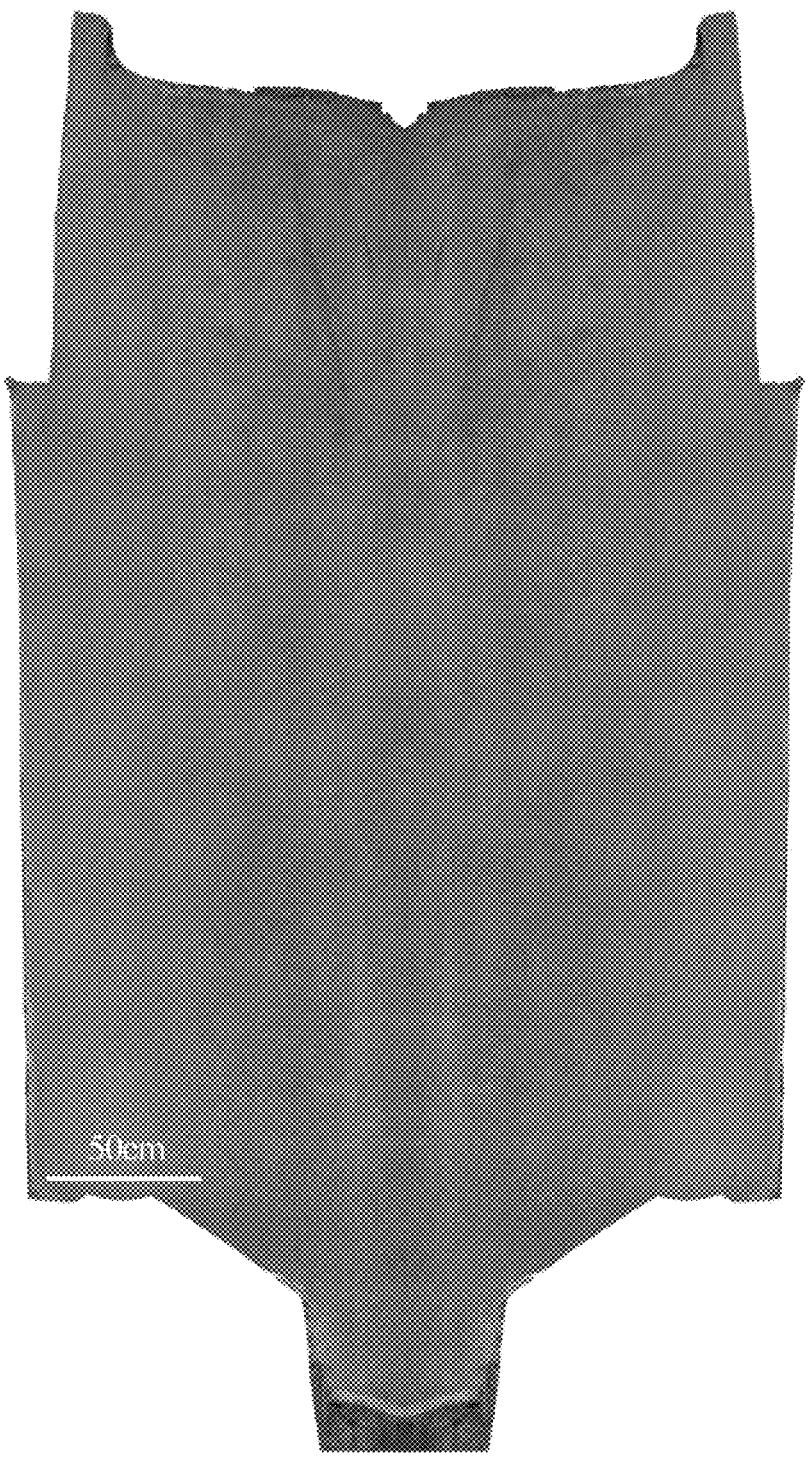
FIG. 4 is an electronic microscope image showing macro examination results of 100 ton of a 30Cr2Ni4 steel ingot in accordance with one embodiment of the invention.

100 t of 30Cr2Ni4 steel ingot was casted and taped in the form of eccentric bottom tapping for preventing steel slag from entering a steel ladle. A content of phosphorus was controlled at 0.005 wt. % before the tapping and the content was not allowed to increase within 15 min. 3 kg of carbon powder per ton of the liquid steel was sprayed for pre-deoxidation. A total content of harmful elements comprising As, Sn, Sb, Bi, and Pb were controlled at 60 ppm, and a content of each of the harmful elements was controlled at less than or equal to 0.005 wt. %. When the liquid steel was poured out of the electric furnace, to each ton of the liquid steel, 15 kg of calcium oxide and 0.25 kg of aluminum were added 4 times, and the calcium oxide and the aluminum were desiccated before addition. After steel slag was formed for 20 min, the slag was skimmed. The steel slag was completely removed after the tapping. For each ton of liquid steel, 12 kg of calcium oxide, 1 kg of carbon powder, and 4 kg of fluorite were added for formation of new slag. A temperature of the steel ladle was controlled at 1,630° C. for vacuum carbon deoxidation process, during which, a vacuum degree reached 1 torr and the vacuum degree was maintained for 25 min while controlling an argon gas flow inside the steel ladle at 80 L/min. A ladle furnace was employed for deep desulfurization process after the pre-deoxidation process. A resulting slag comprises: 60 wt. % of CaO, 7 wt. % of $SiO_2$, 20 wt. % of $CaF_2$, 2 wt. % of $Al_2O_3$, 4 wt. % of MgO, 0.7 wt. % of FeO+MnO, and remaining Fe. A retention time for maintaining the content of FeO+MnO to be 0.7 wt. % of the total steel slag exceeds 30 min prior to the tapping, and the content of sulfur was 0.003 wt. %. The liquid metal refined in the ladle furnace was introduced to the vacuum degassing furnace for smelting, and the vacuum degree in the vacuum degassing furnace was controlled at 0.5 torr. The liquid metal was purified for 25 min by stirring while introducing argon gas from a bottom of the ladle at a flow of 80 L/min. After vacuum casting, it was known from the steel ingot anatomical results that no A-shaped segregation existed in internal steel ingot, an average of the total oxygen content of the steel ingot was 10 ppm, as shown in FIG. 4.

Working process and results of the method of the invention

The method for controlling the A-shaped segregation of steel ingot of the invention decreases the content of inclusions and gas, particularly the content of the oxide, by controlling the purification of the liquid metal. The steel slag is prevented from entering the ladle, thereby preventing rephosphorization during the refining process and preventing the content of phosphorus from increasing. The vacuum carbon deoxidation removes the deoxidation products and decreases the content of the inclusions. The content of sulfur is controlled at 0.005 wt. % below by treating the steel slag with the deep desulfurization process, and the smelting duration is shortened. The smelting process in the vacuum degassing furnace is conducive to the decrease of the gas content. The method of the invention improves the purity of the liquid metal, eliminates or prevents the A-shaped segregation.

It is known from the above experiment results that compared with other methods for controlling the A-shaped segregation, the method of the invention is much suitable for practical operation. The method is capable of controlling the content of oxygen during the purification and the smelting process, decreasing the content of inclusions, particularly the oxide, inhibiting or eliminating the A-shaped segregation in the steel ingot and continuous casting blanks, and improving the internal quality of the blanks, thereby being a simple and practical method for improving the quality of the steel ingot and the blanks. The invention provides a novel method for controlling the A-shaped segregation in steel ingot having large cross section and large tonnage and in continuous casting blanks having large cross section. The method overcomes the technological bottlenecks in controlling the A-shaped segregation and is conducive to the development of the solidification segregation theory.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling A-shaped segregation of steel ingot, the method comprising the following steps:
   1) upon tapping from an electric furnace, controlling a content of phosphorus at less than or equal to 0.005 wt. %, preventing steel slag from entering a ladle, controlling a content of harmful elements at less than or equal to 100 ppm; adding between 3 and 15 kg (both inclusive) of CaO and less than or equal to 0.5 kg of aluminum per ton of liquid steel for preventing the liquid steel from boiling;
   2) pre-deoxidizing the liquid steel using a vacuum carbon deoxidation process for reducing of inclusions;
   3) de-sulfurizing using slag desulfurization technology in a ladle furnace for further removing the inclusions, controlling a content of oxygen, and controlling a content of sulfur at less than or equal to 0.005 wt. %; and
   4) performing vacuum degasification in a vacuum degassing furnace for purifying the liquid steel and controlling a total oxygen content at less than or equal to 15 ppm; and casting in the presence of inert gas or in vacuum for further de-oxidization or, alternatively, for preventing the content of the oxygen from increasing.

2. The method of claim 1, wherein in step 1), the content of phosphorus is controlled at less than or equal to 0.005 wt. % before the tapping and not allowed to increase for between 10 and 20 min (both inclusive); and carbon powder is added at an amount of between 0.1 and 2 kg per ton of the liquid steel for micro-deoxidization.

3. The method of claim 1, wherein in step 1), the harmful elements comprise As, Sn, Sb, Bi, and Pb.

4. The method of claim 1, wherein in step 1), no aluminum is added.

5. The method of claim 1, wherein in step 1), the tapping from the electric furnace employs eccentric bottom tapping or inverting a bottom drain ladle for preventing the steel slag from entering a refining ladle.

6. The method of claim 1, wherein in step 1), CaO and aluminum are desiccated before addition, and are added synchronously for between 2 and 10 times.

7. The method of claim 1, wherein the vacuum carbon deoxidation process in step 2) comprises: to each ton of the liquid steel, adding between 5 and 15 kg (both inclusive) of CaO, between 1 and 4 kg (both inclusive) of carbon powder, and between 0.5 and 5 kg (both inclusive) of a fluorite after removing steel slags from the liquid steel.

8. The method of claim 1, wherein in step 2), a temperature of the ladle before the vacuum carbon deoxidation process is controlled at between 1,610 and 1,650° C. (both inclusive); and a vacuum degree is controlled between 0.25 and 5 torr for between 10 and 30 min while argon gas flow is controlled between 30 and 100 L/min.

9. The method of claim 1, wherein
   after the pre-deoxidization in step 3), deep desulphurization is performed in the ladle furnace, a resulting slag comprises: between 50 and 70 wt. % (both inclusive) of CaO, between 6 and 10 wt. % (both inclusive) of $SiO_2$, between 10 and 30 wt. % (both inclusive) of $CaF_2$, between 1 and 3 wt. % (both inclusive) of $Al_2O_3$, less than 6 wt. % of MgO, less than 0.9 wt. % of FeO+MnO, and remaining Fe;
   a retention time for maintaining the content of FeO+MnO to be less than 0.9 wt. % of the total steel slag exceeds 30 min, and the content of sulfur is required to be less than or equal to 0.005 wt. %; and
   the vacuum carbon deoxidation is performed again if the smelting process does not meet the above requirements.

10. The method of claim 1, wherein in step 4), the liquid steel after refined in the ladle furnace is introduced to the vacuum degassing furnace for smelting, the vacuum degree in the vacuum degassing furnace is controlled between 0.25 and 2 torr (both inclusive);
   the liquid steel is purified for between 20 and 40 min by stirring while introducing argon gas from a bottom of the ladle at a flow of between 40 and 100 L/min; and
   during the casting, vacuum casting is performed on large steel ingot having a weight of exceeding 30 ton for further deoxidation and degassing, or normal pressure casting is performed in the presence of inert gas for preventing the content of oxygen from increasing.

* * * * *